No. 749,127. PATENTED JAN. 5, 1904.
F. W. BREHM.
PHOTOGRAPHIC CAMERA.
APPLICATION FILED FEB. 18, 1903.
NO MODEL.
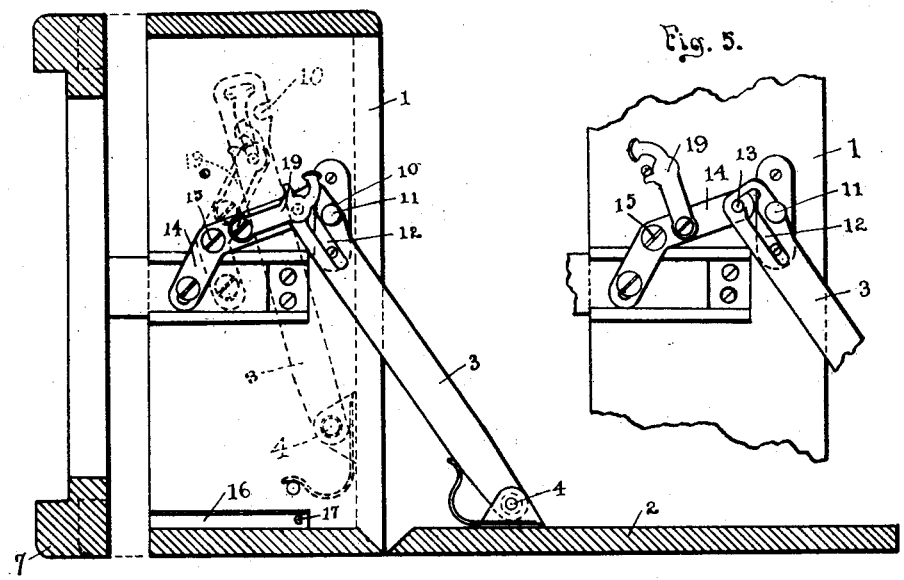
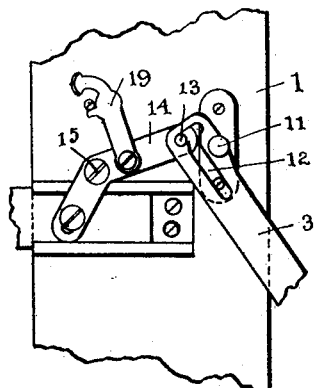
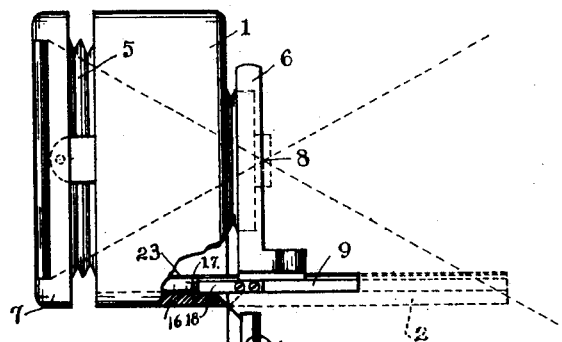
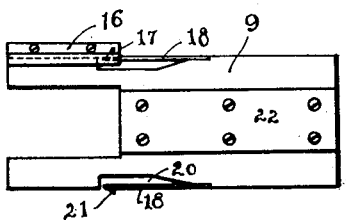
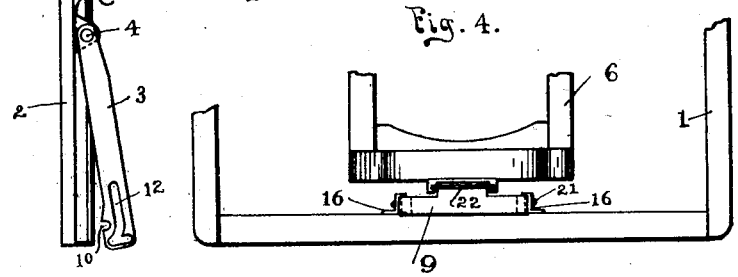
WITNESSES: Frederick W. Brehm INVENTOR.
BY ATTORNEY.

No. 749,127.                                           Patented January 5, 1904.

UNITED STATES PATENT OFFICE.

FREDERICK W. BREHM, OF ROCHESTER, NEW YORK, ASSIGNOR TO GUNDLACH OPTICAL COMPANY, OF ROCHESTER, NEW YORK, A CORPORATION.

PHOTOGRAPHIC CAMERA.

SPECIFICATION forming part of Letters Patent No. 749,127, dated January 5, 1904.

Original application filed October 18, 1901, Serial No. 79,088. Divided and this application filed February 18, 1903. Serial No. 143,894. (No model.)

*To all whom it may concern:*

Be it known that I, FREDERICK W. BREHM, a citizen of the United States, residing at Rochester, in the county of Monroe and State of New York, have invented a new and useful Improvement in Photographic Cameras, of which the following is a specification.

My invention relates to improvements in photographic cameras, this application being a division of my prior application, filed October 18, 1901, Serial No. 79,088.

The object of the invention is the production of a camera that is adapted for special use with wide-angle lenses. This object I attain in the camera that is shown in the accompanying drawings, in which—

Figure 1 is a section through a camera, showing in full lines the position of certain of the parts when the front door is opened and in dotted lines the position of these parts when the door is closed. Fig. 2 is a view, partly in section and partly in elevation, of a camera provided with my invention and indicating how the ordinary bed of a camera cuts off the rays of light when the wide-angle lens is used. Fig. 3 is a plan view of the supplemental bed and one of the slideways for holding the same in position; Fig. 4, a front view of the supplemental bed in position and supporting the camera-front, and Fig. 5 is a view showing the position of some of the parts shown in Fig. 1 when it is desired to disengage the supporting-brace and drop the camera-front.

In the manufacture of a camera for general use it is necessary to adapt it for use with wide-angle lenses. The focus of such lenses is so short that the front door or bed of the ordinary folding camera projects into the field and cuts out the lower part of the picture. In order to prevent this result, I drop the door down out of the way and insert a short supplemental bed for supporting the front of the camera.

In the drawings, in which similar reference characters designate corresponding parts in all of the views, 1 represents the camera box or body, to the lower front edge of which is pivoted the door 2. The door is supported when lowered by the braces 3, which are pivoted thereto at one end, as shown at 4, and are secured at their other ends to the inner sides of the box by means hereinafter described.

5 designates the bellows, 6 the movable front which carries the lens, (not shown,) and 7 the bellows-frame.

Inasmuch as a wide-angle lens has a very short focus, it is necessary when one is employed with the ordinary bed to move the front with the lens well back to the rear of the bed, which places so much of the latter in front of the lens that it frequently intercepts some of the rays of light, and thus cuts off part of the picture. In Fig. 2 I have shown my camera prepared for use with such a lens. The dotted lines intersecting at 8 indicate the rays of light which fall upon the outer edges of the plate, and the horizontal lines indicate the door or bed 2 in its normal position. It will be seen from this that the door cuts off those rays of light which fall upon the upper part of the plate. For this reason I move the bed 2 from its normal position and substitute in its place a shorter bed, which I have shown at 9, this bed projecting, preferably, about half as far as the door 2. In order to swing the bed 2 to the position shown in full lines in Fig. 2, it is necessary to detach the braces 3 from the inside of the camera-box, to which they are secured by the means shown in Figs. 1 and 5. These braces are provided near their upper ends with notches 10, which engage with pins, lugs, or projections 11 on the box when the door 2 is open, as shown in Fig. 1. These braces also have slots 12 near their upper ends, into which project pins 13, which are carried by bell-cranks 14, the bell-cranks being pivoted to the inner sides of the box 1 at 15. The braces are held against the bell-cranks and in position for engagement with the pins 11 by means of levers 19, which are pivoted to the bell-cranks and press against the ends of the pins 13. These levers are adapted to be turned upwardly, as shown in Fig. 5, when the braces 3 may be disengaged from the pins 11 and 13 and the door may be dropped, as shown in Fig. 2.

In the bottom of the camera-box I place slideways 16, between which the supplemental bed 9 is adapted to be inserted, the said ways being so positioned that the camera-front can be run directly on the bed, as the parts are so designed as to bring the plate or runway 22 in line with the stationary runway 23, Fig. 2, upon which the camera-front rests when the camera is closed. These ways are each provided with notches at 17, with which engage the hooked ends of the catch-springs 18 on the supplemental bed when the latter is in position. When it is desired to remove the bed 9 from its position in the slideways, the operator squeezes the springs 18 into the notches 20, thus disengaging the projections 21 from the notches 17, after which the bed may be easily withdrawn. The bed when not in use may be carried in any suitable manner, being preferably made of such a size that will permit it to be carried inside the camera-box when it is closed. The front 2 is then raised in a position to bring the braces 3 in engagement with the pins 11 and 13 and is held in this position by the levers 19 being snapped down over the pins 13.

Having thus described my invention, what I claim as new, and desire to secure by Letters Patent, is—

1. In a camera, a box or body, slideways in said box or body, a bed which is adapted for insertion within said slideways, and a camera-front that is movable upon said bed.

2. In a camera, a box or body, slideways having notches secured to said box or body, a bed which is adapted for insertion within said slideways, spring-catches on said bed for engaging with the notches in the slideways to lock the bed in position, and a camera-front which is movable upon said bed.

3. In a camera, a box or body, a hinged bed normally closing the front of said box, a movable front for supporting the lens, means for supporting the bed in a proper position for photographic work, so that the front may be moved thereon, means whereby the supports for the bed may be disengaged and the bed dropped from in front of the camera-box, a supplemental bed, and means in the camera-box to which the supplemental bed may be attached, for the purpose specified.

4. In a camera, a box or body, a bed normally closing the front of said box, a camera-front, means for supporting the bed at right angles to its closed position so that the front may be moved thereon, means whereby the supports may be detached and the bed dropped from in front of the camera-box, slideways secured to said box, and a supplemental bed adapted for insertion within said slideways, for the purpose specified.

In testimony whereof I affix my signature in the presence of two witnesses.

FREDERICK W. BREHM.

Witnesses:
  HENRY H. TURNER,
  ISAAC ADLER.